(12) United States Patent
Fisher et al.

(10) Patent No.: US 12,446,803 B2
(45) Date of Patent: Oct. 21, 2025

(54) METHOD AND SYSTEM OF MEASURING BRAIN OXYGENATION USING DEOXYHEMOGLOBIN CONTRAST

(71) Applicant: THORNHILL SCIENTIFIC INC., North York (CA)

(72) Inventors: Joseph Arnold Fisher, Thornhill (CA); Olivia Sobczyk, Etobicoke (CA); James Duffin, Toronto (CA); Julien Poublanc, Toronto (CA); David J. Mikulis, Oakville (CA); Ece Su Sayin, Windsor (CA)

(73) Assignee: THORNHILL SCIENTIFIC INC., North York (CA)

( * ) Notice: Subject to any disclaimer, the term of this patent is extended or adjusted under 35 U.S.C. 154(b) by 0 days.

(21) Appl. No.: 18/785,732

(22) Filed: Jul. 26, 2024

(65) Prior Publication Data

US 2025/0040840 A1    Feb. 6, 2025

Related U.S. Application Data

(60) Provisional application No. 63/532,293, filed on Aug. 11, 2023, provisional application No. 63/530,798, filed on Aug. 4, 2023.

(51) Int. Cl.
*A61B 5/00*      (2006.01)
*A61B 5/055*     (2006.01)
(Continued)

(52) U.S. Cl.
CPC ........ *A61B 5/14542* (2013.01); *A61B 5/0042* (2013.01); *A61B 5/055* (2013.01); *A61B 5/4064* (2013.01); *G01R 33/50* (2013.01)

(58) Field of Classification Search
CPC ... A61B 5/14542; A61B 5/0042; A61B 5/055; A61B 5/4064; A61B 2560/0223; G01R 33/50
See application file for complete search history.

(56) References Cited

U.S. PATENT DOCUMENTS

| | | | | |
|---|---|---|---|---|
| 11,915,412 | B2 * | 2/2024 | Zagorchev | ............. G06T 19/20 |
| 2009/0246138 | A1 * | 10/2009 | Santosh | ................. G01R 33/54 |
| | | | | 600/420 |

(Continued)

FOREIGN PATENT DOCUMENTS

| WO | WO-2021137196 A1 | 7/2021 |
|---|---|---|
| WO | WO - 2023286040 A1 | 1/2023 |

OTHER PUBLICATIONS

Christen T, Bouzat P, Pannetier N, et al. "Tissue Oxygen Saturation Mapping with Magnetic Resonance Imaging." Journal of Cerebral Blood Flow & Metabolism. 34(9).pp. 1550-1557 (Year: 2014).*

(Continued)

*Primary Examiner* — Amal Aly Farag
(74) *Attorney, Agent, or Firm* — Perry + Currier Inc.

(57) ABSTRACT

The present specification discloses a method for measuring brain tissue oxygenation in a subject. The method comprises the following steps: measuring a magnetic signal in a reference voxel of the subject's brain while imposing a series of arterial oxygen saturation changes using sequential gas delivery; calculating a relationship between the magnetic signal and the arterial oxygen saturation in the reference voxel; measuring a magnetic signal in a target voxel; and calculating the hemoglobin saturation in the target voxel based on the established relationship between the magnetic signal and the SaO2 in the reference voxel. This calibration of magnetic signal for $SaO_2$ enables the conversion of magnetic signal to $SaO_2$ throughout blood-containing voxels throughout the brain.

16 Claims, 15 Drawing Sheets

(51) Int. Cl.
*A61B 5/145* (2006.01)
*G01R 33/50* (2006.01)

(56) References Cited

U.S. PATENT DOCUMENTS

2015/0313540 A1 11/2015 Deuchar et al.
2023/0056088 A1* 2/2023 Crawley ............ A61B 5/14546

OTHER PUBLICATIONS

Mark, Clarisse I. et al. "Improved fMRI calibration: precisely controlled hyperoxic versus hypercapnic stimuli." Neuroimage 54.2 (2011): 1102-1111.
Ito et al.; "Non-invasive prospective targeting of arterial PCO2 in subjects at rest"; J Physiol 586.15; Jun. 19, 2008; pp. 3675-3682.
Balaban, Dahlia Y., et al. "The in-vivo oxyhaemoglobin dissociation curve at sea level and high altitude." Respiratory physiology & neurobiology 186.1 (2013): 45-52.
Fierstra, Jorn, et al. "End-inspiratory rebreathing reduces the end-tidal to arterial PCO 2 gradient in mechanically ventilated pigs." Intensive care medicine 37 (2011): 1543-1550.
Fierstra, J, et al. "Measuring cerebrovascular reactivity: what stimulus to use?." The Journal of physiology 591.23 (2013): 5809-5821.
Fisher, Joseph A. "The CO2 stimulus for cerebrovascular reactivity: fixing inspired concentrations vs. targeting end-tidal partial pressures." Journal of Cerebral Blood Flow & Metabolism 36.6 (2016): 1004-1011.
Fisher, Joseph A. et al. "Sequential gas delivery provides precise control of alveolar gas exchange." Respiratory Physiology & Neurobiology 225 (2016): 60-69.
Harada, Taisuke, et al. "Quantitative susceptibility mapping: basic methods and clinical applications." Radiographics 42.4 (2022): 1161-1176.
Slessarev, Marat, et al. "Prospective targeting and control of end-tidal CO2 and O2 concentrations." The Journal of physiology 581.3 (2007): 1207-1219.

* cited by examiner

METHOD AND SYSTEM OF MEASURING BRAIN OXYGENATION USING DEOXYHEMOGLOBIN CONTRAST

CROSS-REFERENCE TO RELATED APPLICATIONS

This application claims the benefit of U.S. Provisional Patent Application No. 63/530,798 entitled "Measuring brain tissue oxygenation through BOLD (blood oxygen level-dependent) calibration using deoxyhemoglobin contrast methods" filed Aug. 4, 2023, and U.S. Provisional Patent Application No. 63/532,293 entitled "Measuring brain tissue oxygenation through BOLD (blood oxygen level-dependent) calibration using deoxyhemoglobin contrast methods" filed Aug. 11, 2023, the entire contents of which are incorporated herein by reference.

FIELD

The present specification is directed to medical imaging, and the quantitative measurement of brain oxygenation using deoxyhemoglobin as a contrast agent in magnetic resonance imaging.

BACKGROUND

Quantitative Susceptibility Mapping (QSM) measures magnetic susceptibility in tissues, providing relative strengths and directions of susceptibility, as discussed by Harada et al. (Harada, T., K. Kudo, N. Fujima, M. Yoshikawa, Y. Ikebe, R. Sato, T. Shirai, Y. Bito, I. Uwano, and M. Miyata. 2022. 'Quantitative Susceptibility Mapping: Basic Methods and Clinical Applications', *Radiographics*, 42:1161-76). While QSM can inform on relative susceptibility, particularly deoxygenated hemoglobin concentration, it is expressed in arbitrary units, preventing direct correlation with physiological measures like arterial and venous oxygen saturation. Current methodologies, including QSM, face significant limitations in determining oxygen extraction fraction due to the lack of a conversion factor relating QSM values to arterial and venous oxygen saturation, and the inability to provide fractional differences. Integration of blood flow data does not resolve these issues, highlighting the need for improved techniques to accurately determine OEF in clinical and research settings.

SUMMARY

Current methods for measuring brain oxygenation, such as Quantitative Susceptibility Mapping (QSM), provide only relative measurements of the oxygen extraction fraction (OEF). The present specification addresses this by providing a method and system for empirically measuring brain tissue oxygenation. This method involves measuring magnetic signals in a reference voxel while imposing arterial blood oxygen saturation ($SaO_2$) changes using sequential gas delivery. This enables the calibration of MRI measurements to deoxyhemoglobin concentration, allowing for the accurate quantification of $SaO_2$ and OEF in target voxels.

A first aspect of the specification provides a method of measuring brain tissue oxygenation in a subject. This method includes measuring a magnetic signal in a reference voxel of the subject's brain while imposing a series of arterial blood oxygen saturation ($SaO_2$) changes in the subject using sequential gas delivery. The method also includes calculating a relationship between the magnetic signal and the $SaO_2$ in the reference voxel. In addition, the method involves measuring a magnetic signal in a target voxel and calculating the hemoglobin saturation ($SO_2$) in the target voxel based on the relationship between the magnetic signal and the $SaO_2$ in the reference voxel.

In one example, measuring the magnetic signal in the reference voxel and the target voxel includes applying multi-echo T2* imaging.

In another example, the reference voxel is in the middle cerebral artery or choroid plexus.

In another example, the series of $SaO_2$ changes includes a step pattern, a ramping pattern, or a sinusoidal pattern.

In another example, the method further includes measuring a magnetic signal in a plurality of voxels, including the target voxel, and calculating the hemoglobin saturation in the plurality of voxels based on the relationship between the magnetic signal and the $SaO_2$ in the reference voxel. The method also includes converting the hemoglobin saturation to a partial pressure of oxygen ($PO_2$) and generating a $PO_2$ map for the plurality of voxels.

In another example, the method further includes identifying voxels as arterial or venous based on pre-determined hemoglobin saturation thresholds and generating an angiogram or venogram based on the pre-determined hemoglobin saturation thresholds.

In another example, the method further includes scoring the hemoglobin saturation of the target voxel against a statistical value, wherein the statistical value represents the hemoglobin saturation in a voxel of an opposite hemisphere, a corresponding region of interest, another subject, or a population of subjects.

In another example, the method further includes assessing the severity of ischemia, a transplant, a graft, inflammation, a brain injury, a tumor, sickle cell disease, hypertension, or multiple sclerosis based on the score.

A second aspect of the specification provides a system for measuring brain tissue oxygenation in a subject. This system includes a sequential gas delivery device for imposing a series of $SaO_2$ changes in the subject, a magnetic resonance imaging device for measuring magnetic signals in a reference voxel and a target voxel of the subject's brain, and a processor configured to calculate a relationship between the magnetic signal and the $SaO_2$ in the reference voxel and to calculate the hemoglobin saturation ($SO_2$) in the target voxel based on the relationship between the magnetic signal and the $SaO_2$ in the reference voxel.

In one example, the magnetic resonance imaging device is configured to measure the magnetic signals with multi-echo T2* or quantitative susceptibility mapping.

In another example, the reference voxel is in the middle cerebral artery or choroid plexus.

In another example, the series of $SaO_2$ changes includes a step pattern, a ramping pattern, or a sinusoidal pattern.

In another example, the magnetic resonance imaging device is further configured to measure the magnetic signal in a plurality of voxels, including the target voxel, and calculate the hemoglobin saturations in the plurality of voxels based on the relationship between the magnetic signal and the $SaO_2$ in the reference voxel. The processor is further configured to convert the hemoglobin saturations to partial pressures of oxygen ($PO_2$) and generate a $PO_2$ map for the plurality of voxels.

In another example, the system further includes generating an angiogram or venogram based on thresholding the $PO_2$ map to arterial or venous oxygen saturations.

In another example, the processor is further configured to score the hemoglobin saturation of the target voxel against a statistical value, wherein the statistical value represents the hemoglobin saturation in a voxel of an opposite hemisphere, a corresponding region of interest, another subject, or a population of subjects.

In another example, the processor is further configured to assess the severity of ischemia, a transplant, a graft, inflammation, a brain injury, a tumor, sickle cell disease, hypertension, or multiple sclerosis based on the score.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Embodiments are described with reference to the following figures.

DETAILED DESCRIPTION

TABLE OF ABBREVIATIONS
The following abbreviations are used herein:

| | |
|---|---|
| BOLD | Blood Oxygen Level Dependent |
| G1 | first gas |
| G2 | second gas |
| De | dephasing |
| ME-$T_2$* | multi-echo $T_2$*-weighted imaging |
| MRI | magnetic resonance imaging |
| OEF | oxygen extraction fraction |
| $P_aCO_2$ | arterial partial pressure of carbon dioxide |
| $P_aO_2$ | arterial partial pressure of oxygen |
| $PCO_2$ | partial pressure of carbon dioxide |
| $PO_2$ | partial pressure of oxygen |
| $P_{ET}CO_2$ | end tidal partial pressure of carbon dioxide |
| $P_{ET}O_2$ | end tidal partial pressure of oxygen |
| QSM | quantitative susceptibility mapping |
| Re | rephasing |
| RF | radiofrequency |
| ROI | region of interest |
| SGD | sequential gas delivery |
| $SaO_2$ | arterial blood-oxygen saturation |
| $SvO_2$ | venous blood-oxygen saturation |
| TE | echo time |
| TR | repetition time |

Definitions

"About" herein refers to a range of +20% of the numerical value that follows. In one example, the term "about" refers to a range of +10% of the numerical value that follows. In another example, the term "about" refers to a range of +5% of the numerical value that follows.

"Health condition" herein refers to an anatomical, physiological, or mental state of a subject.

"Hyperoxic" herein refers to blood with abnormally high $O_2$ levels. Generally, a hyperoxic $P_aO_2$ is above about 100 mmHg.

"Hypoxic" herein refers to blood with abnormally low $O_2$ levels. Generally, a hypoxic $P_aO_2$ is below about 80 mmHg.

"Normoxic" herein refers to blood with normal $O_2$ levels. Generally, a normoxic $P_aO_2$ is between about 70 mmHg and about 110 mmHg.

System and Method

The specification provides a method and system for calibrating MRI measurements to the concentration of deoxyhemoglobin and vice versa, thus enabling the quantification of $SaO_2$ and OEF.

Figure 1:
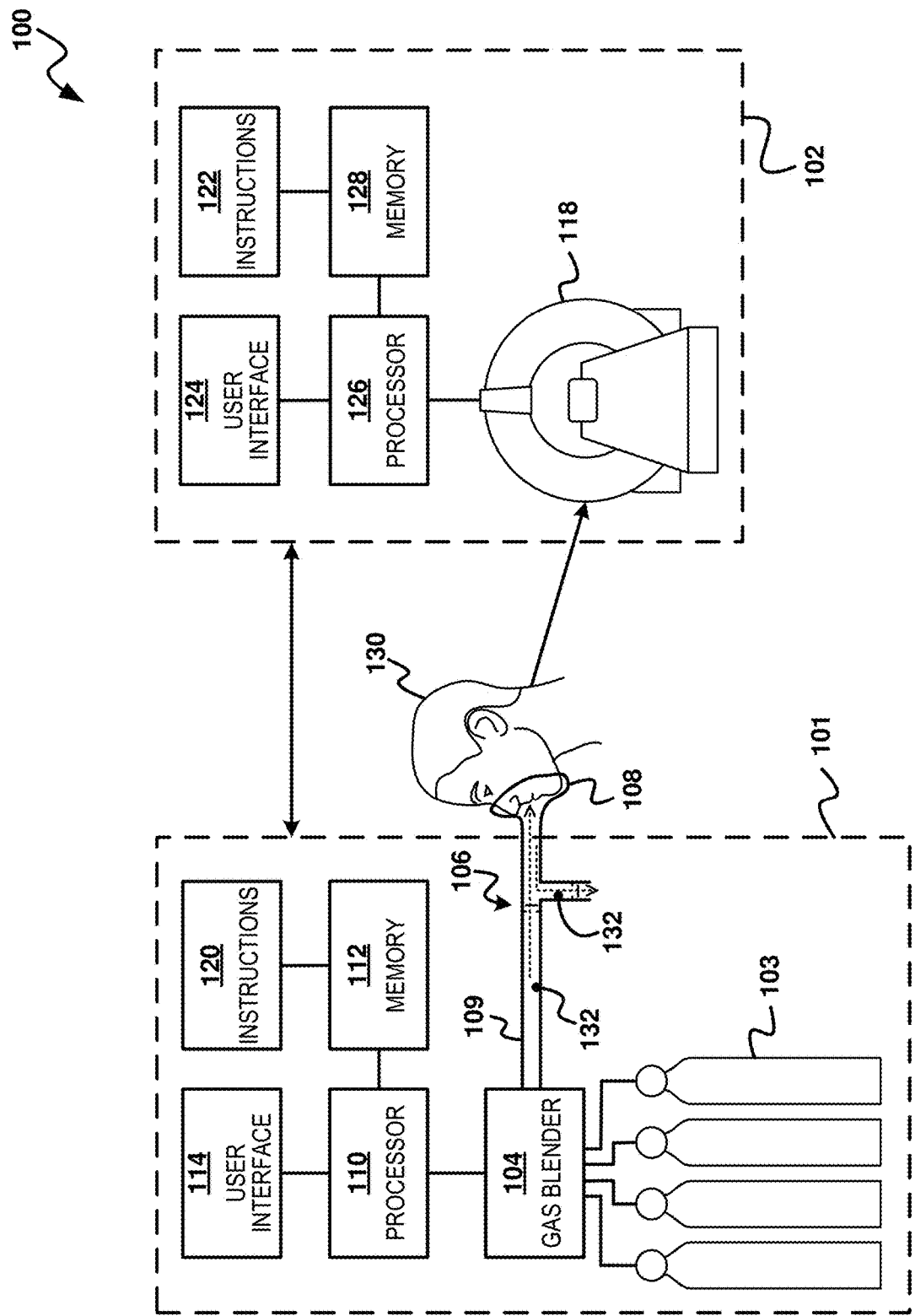
FIG. 1 is a schematic diagram of a system for measuring brain tissue reoxygenation according to one example.

FIG. 1 shows a system 100 for measuring brain oxygenation using deoxyhemoglobin contrast. The system 100 includes a sequential gas delivery (SGD) device 101 to provide delivery gases to a subject 130 and target a $P_aO_2$. Using the SGD device, targeted $P_aO_2$ values may be attained while maintaining normocapnia. The system 100 further includes a magnetic resonance imaging (MRI) device 102. The SGD device 101 includes gas supplies 103, a gas blender 104, a mask 108, a processor 110, memory 112, and a user interface 114. The SGD device 101 may be configured to control end-tidal partial pressure of $CO_2$ ($P_{ET}CO_2$) and end-tidal partial pressure of $O_2$ ($P_{ET}O_2$) by generating predictions of gas flows to actuate target end-tidal values. The SGD device 101 may be an RespirAct™ device (Thornhill Medical™: Toronto, Canada) specifically configured to implement the techniques discussed herein. For further information regarding sequential gas delivery, U.S. Pat. No. 8,844,528, US Publication No. 2018/0043117, and U.S. Pat. No. 10,850,052, which are incorporated herein by reference, may be consulted.

The gas supplies 103 may provide carbon dioxide, oxygen, nitrogen, and air, for example, at controllable rates, as defined by the processor 110. A non-limiting example of the gas mixtures provided in the gas supplies 103 is:
 a. Gas A: 10% $O_2$, 90% $N_2$;
 b. Gas B: 10% $O_2$, 90% $CO_2$;
 c. Gas C: 100% $O_2$; and
 d. Calibration gas: 10% $O_2$, 9% $CO_2$, 81% $N_2$.

The gas blender 104 is connected to the gas supplies 103, receives gases from the gas supplies 103, and blends received gases as controlled by the processor 110 to obtain a gas mixture, such as a first gas (G1) and a second gas (G2) for sequential gas delivery.

The second gas (G2) is a neutral gas in the sense that it has about the same composition as the gas exhaled by the subject 130, which includes about 4% to 5% carbon dioxide. In some examples, the second gas (G2) may include gas actually exhaled by the subject 130. The first gas (G1) has a composition of oxygen that is equal to the target $P_{ET}O_2$ and preferably no significant amount of carbon dioxide. For example, the first gas (G1) may be air (which typically has about 0.04% carbon dioxide), may consist of 21% oxygen and 79% nitrogen, or may be a gas of similar composition, preferably without any appreciable $CO_2$.

The processor 110 may control the gas blender 104, such as by electronic valves, to deliver the gas mixture in a controlled manner.

The mask 108 is connected to the gas blender 104 and delivers gas to the subject 130. The mask 108 may be sealed to the subject's face to ensure that the subject only inhales gas provided by the gas blender 104 to the mask 108. In some examples, the mask is sealed to the subject's face with skin tape such as Tegaderm™ (3M™: Saint Paul, Minnesota). A valve arrangement 106 may be provided to the SGD device 101 to limit the subject's inhalation to gas provided by the gas blender 104 and limit exhalation to the room. In the example shown, the valve arrangement 106 includes an inspiratory one-way valve from the gas blender 104 to the mask 108, a branch between the inspiratory one-way valve and the mask 108, and an expiratory one-way valve at the branch. Hence, the subject 130 inhales gas from the gas blender 104 and exhales gas to the room.

The subject 130 may breathe spontaneously or be mechanically ventilated.

The gas supplies 103, gas blender 104, and mask 108 may be physically connectable by a conduit 109, such as tubing, to convey gas. Any suitable number of sensors 132 may be positioned at the gas blender 104, mask 108, and/or conduits 109 to sense gas flow rate, pressure, temperature, and/or similar properties and provide this information to the processor 110. Gas properties may be sensed at any suitable location, so as to measure the properties of gas inhaled and/or exhaled by the subject 130.

The processor 110 may include a central processing unit (CPU), a microcontroller, a microprocessor, a processing core, a field-programmable gate array (FPGA), an application-specific integrated circuit (ASIC), or a similar device capable of executing instructions. The processor 110 may be connected to and cooperate with the memory 112 that stores instructions and data.

The memory 112 includes a non-transitory machine-readable medium, such as an electronic, magnetic, optical, or other physical storage device that encodes the instructions. The medium may include, for example, random access memory (RAM), read-only memory (ROM), electrically erasable programmable read-only memory (EEPROM), flash memory, a storage drive, an optical device, or similar.

The user interface 114 may include a display device, touchscreen, keyboard, speaker, microphone, indicator, buttons, the like, or a combination thereof to allow for operator input and/or output.

Instructions 120 may be provided to carry out the functionality and methods described herein. The instructions 120 may be directly executed, such as a binary file, and/or may include interpretable code, bytecode, source code, or similar instructions that may undergo additional processing to be executed. The instructions 120 may be stored in the memory 112.

The system 100 further includes an MRI device 102 for conducting magnetic resonance imaging on the subject 130. A suitable MRI system may include a sensor 118 such as a 3T MRI system. A suitable example of a 3T MRI system is the Signa HDxt 3.0T™, provided by GE Healthcare (Milwaukee, USA). In addition to the sensor 118, the MRI device 102 may further include a processor 126, a memory 128, and a user interface 124.

Any description of the processor 126 may apply to the processor 110 and vice versa. Likewise, any description of the memory 128 may apply to the memory 112 and vice versa. Similarly, any description of the instructions 122 may apply to the instructions 120 and vice versa. Also, any description of user interface 124 may apply to user interface 114, and vice versa. In some implementations, the MRI device 102 and the SGD device 101 share one or more of a memory, processer, user interface, and instructions, however, in the present disclosure, the MRI device 102 and the SGD device 101 will be described as having respective processors, user interfaces, memories, and instructions. The processor 110 of the SGD device 101 may transmit data and instructions to the processor 126 of the MRI device 102. The processor 126 of the MRI device 102 may transmit data and instructions to the processor 110 of the SGD device 101. The system 100 may be configured to synchronize MRI imaging obtained by the MRI device 102 with measurements obtained by the SGD device 101.

Figure 4:
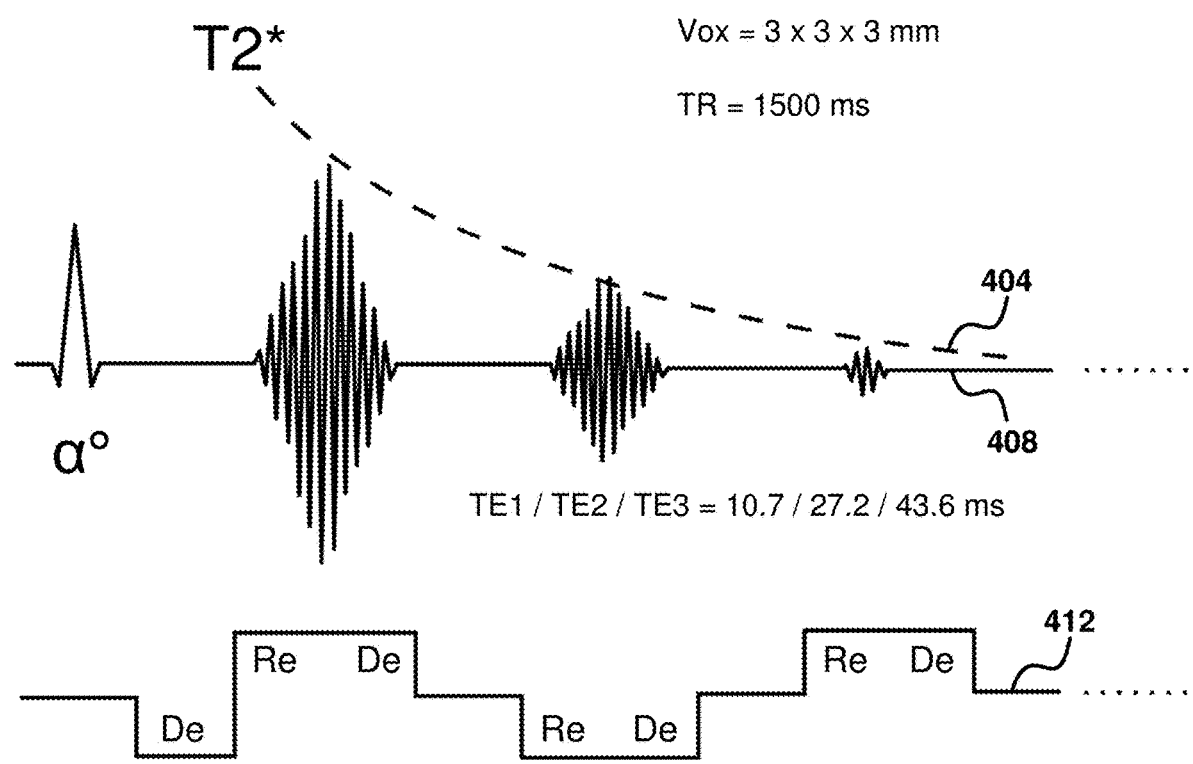
FIG. 4 is a schematic diagram of an MRI protocol for measuring a magnetic signal according to the method of FIG. 2.

The processor 126 may retrieve operating instructions 122 from the memory 128 or from the user interface 124. The operating instructions 122 may include image acquisition parameters. The parameters may include a pre-determined number of contiguous slices, a defined isotropic resolution, a diameter for the field of view, a repetition time (TR), and an echo time. Various protocols may be employed such as multi-echo T2* (ME-T*$_2$) imaging. A non-limiting example of multi-echo T2* parameters is shown in FIG. 4. In this example, the voxel resolution is 3 mm×3 mm×3 mm, the repetition time (TR) is 1500 ms, the first echo time (TE1) is 10.7 ms, the second echo time (TE2) is 272 ms, and the third echo time (TE3) 43.6 ms.

The user interface 124 may include a display device, touchscreen, keyboard, speaker, indicator, microphone, buttons, the like, or a combination thereof to allow for operator input and/or output. Data generated and images acquired by the processor 126 may be displayed at the user interface 124.

Figure 2:
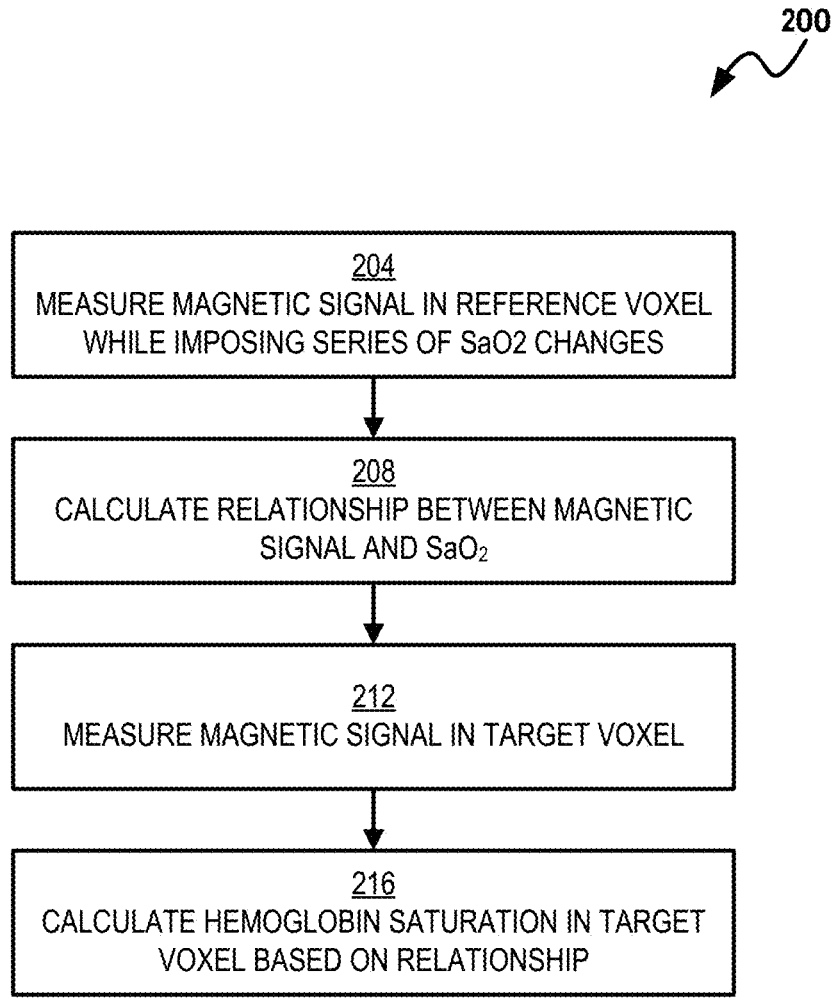
FIG. 2 is a schematic diagram of a method of measuring brain tissue using the system of FIG. 1, according to one example.

FIG. 2 shows an example method 200 of measuring brain tissue oxygenation using deoxyhemoglobin contrast. The method 200 may be performed using the system 100, however the method 200 is not particularly limited.

Block 204 comprises measuring a magnetic signal in a reference voxel of the subject's brain while imposing a series of $SaO_2$ changes in the subject 130. In system 100, block 204 is performed by the MRI device 102 which measures the magnetic signal, and the SGD device 101 which imposes the series of $SaO_2$ changes.

The SGD device 101 imposes a series of $SaO_2$ changes in the subject 130 by inducing a first $SaO_2$ for one or more breaths and inducing a second $SaO_2$ for one or more subsequent breaths. This may be repeated for any suitable number of times according to the instructions 120 or inputs received at the user interface 114. The respective $SaO_2$ is induced by delivering a first gas (G1) over a first portion of the breath and delivering a second gas (G1) over the second portion of the breath. G1 has a volume smaller than the tidal volume, such that all of G1 is delivered to the alveoli and none of G1 is delivered to the anatomical dead space. Since G2 is a neutral gas in the sense that it has about the same composition as the gas exhaled by the subject 130 on a previous breath ($P_{ET}X_2$), the arterial blood equilibrates with G1. Thus, the arterial partial pressure of gas X ($PaX_2$) is equal to the partial pressure of gas X in G1.

As a further part of block 204, the SGD device 101 may control the $PCO_2$ in the subject 130.

The processor 110 may convert the first and second $SaO_2$ values into $P_{ET}O_2$ values for use by the SGD device 101. Arterial hemoglobin saturation ($SaO_2$) can be converted into $P_{ET}O_2$ and vice versa by applying the Hill equation (Equation 1) or an equivalent method. In Equation 1, K is the dissociation constant and n is the Hill coefficient. In one implementation of Equation 1, n=-4.4921 pH, K=$5.10^{-142}$ pH$^{157.31}$, and pH=7.4.

$$S_aO_2 = 100 \frac{K(P_{ET}O_2)^n}{1 + K(P_{ET}O_2)^n} \quad \text{Equation 1}$$

Figure 3A:
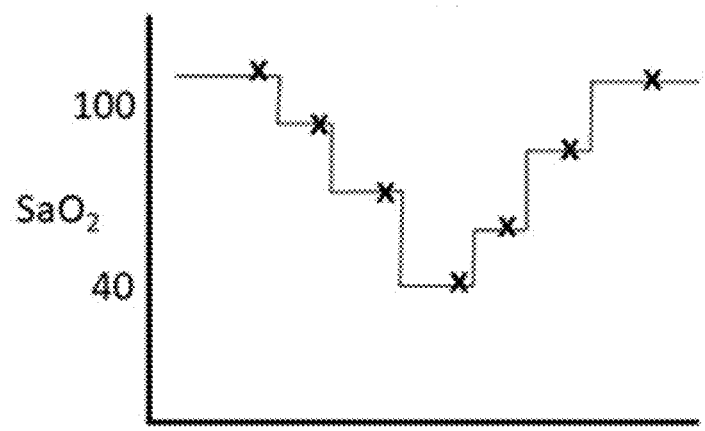
FIG. 3A is a graph showing a step pattern for imposing a series of $SaO_2$ changes according to the method of FIG. 2.
Figure 3B:
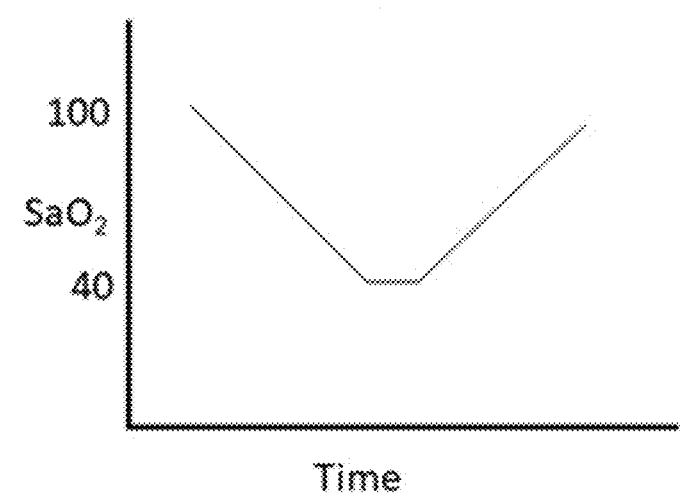
FIG. 3B is a graph showing a ramping pattern for imposing a series of $SaO_2$ changes according to the method of FIG. 2.
Figure 3C:
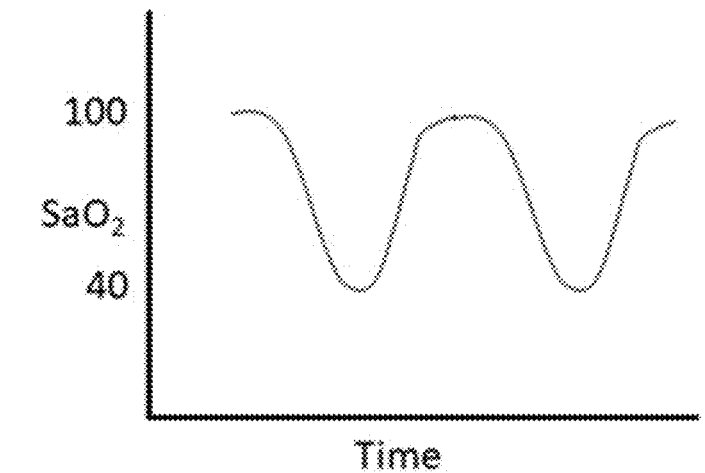
FIG. 3C is a graph showing a sinusoidal pattern for imposing a series of $SaO_2$ changes according to the method of FIG. 2.

The series of $SaO_2$ changes may comprise a calibration pattern. Specific examples of calibration patterns are shown in FIGS. 3A, 3B, and 3C. FIG. 3A shows a step pattern. FIG. 3B shows a ramping pattern. FIG. 3C shows a sinusoidal pattern. In these examples, the $SaO_2$ changes between 100 mmHg to 40 mmHg, however the series of $SaO_2$ is not particularly limited. Generally, the calibration pattern comprises at least two $SaO_2$ changes in a range between about 20 mmHg and about 110 mmHg. The calibration pattern is not particularly limited. Calibration patterns such as the one shown in FIG. 3A that include brief periods at a steady-state $SaO_2$ may compensate for the time delay between the $SaO_2$ implemented in the lungs and the corresponding magnetic signal measured in the reference voxel. Magnetic signals measured at block 208 may be more accurate if a steady state $SaO_2$ is reached.

Block 204 further includes measuring the magnetic signal in the reference voxel, responsive to the series of $SaO_2$ changes. The MRI device 102 produces a magnetic field $B_0$ around the subject 130, generates a radiofrequency pulse, and measures changes in the magnetic signal $B_0$ in response to the radiofrequency pulse. A radiofrequency (RF) magnetic pulse applied via an external coil of the MRI device 102 causes spins in the magnetic field $B_0$ to resonate at their corresponding frequencies. This resonance leads to an increase in magnetization, rotating synchronously to form a net vector orthogonal to $B_0$. This transverse magnetization vector decays over time due to spin-spin interactions, characterized by the time constant $T_2$. Deoxyhemoglobin, a paramagnetic molecule, creates magnetic field inhomogeneities that accelerate this dephasing process, described by a decay constant $T'_2$. The combined effect of spin-spin interactions and field inhomogeneities results in an overall decay time constant $T^*_2$. During the $T^*_2$ decay period, an RF pulse can be applied to generate a spin echo or gradient echo, which helps in calculating $T^*_2$ by inverting the dephasing effects of $T_2$ and $T'_2$.

In multi-echo sequences, multiple echoes are collected at different echo times (TE) to analyze $T^*_2$ decay. For QSM, the phase information from these echoes is processed to create quantitative maps of magnetic susceptibility. As compared to methods using only one echo per TR, multi-echo methods are generally more reliable and reproducible. Thus, the magnetic signal detected in a voxel is representative of the amount of deoxyhemoglobin in that voxel.

FIG. 4 is a schematic diagram showing an example protocol for ME-$T^*_2$. In this example, the voxel size is 3×3×3 mm, and the repetition time (TR) is 1500 ms. The first echo time (TE1) is 10.7 ms, the second echo time (TE2) is 27.3 ms, and the third echo time (TE3) is 43.6 ms. As shown at 404, the rate of relaxation of T2* declines over time. The flip angle ($\alpha°$) of the radiofrequency pulse is represented at 408. The corresponding dephasing (De) and rephasing (Re) gradients are shown at 412.

Figure 5A:
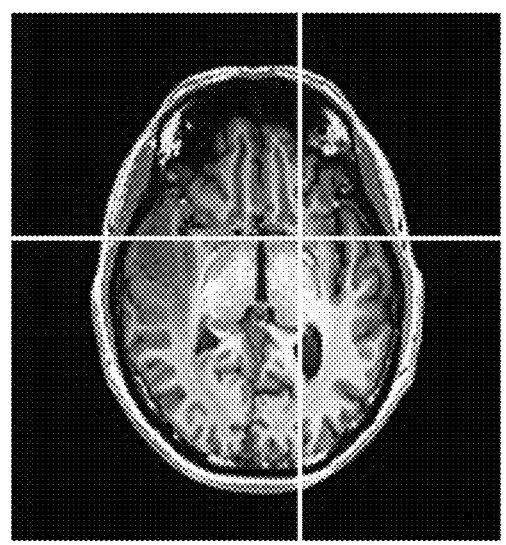
FIG. 5A is an MRI image of a subject's brain showing the reference voxel, according to exemplary performance of the method of FIG. 2.

The MRI device 102 measures magnetic signals in one or more voxels ("volume-pixels"), including the reference voxel. The reference voxel is located in the subject's brain and may be selected according to the instructions 122 or inputs received at the user interface 124. Preferably, the reference voxel is selected to avoid partial voluming which occurs in voxels that overlap with other tissues, contaminating the measurement of the magnetic signal. Furthermore, the reference voxel preferably corresponds to a blood-rich region of the brain with minimal or no oxygen release, so that the magnetic signal represents the alveolar partial pressure of oxygen. Suitable locations for the reference voxel include the middle cerebral artery and the choroid plexus, however other vascularized regions may be suitable depending on the individual and the voxel resolution. The relationship between the magnetic signal and the $SaO_2$ in the artery is very close to linear (especially when the $SaO_2$ is high), but it is a quadratic relationship, which requires the processor 110 to approximate a linear equation. In contrast, the relationship between the magnetic signal and the $SaO_2$ in vascularized tissue is linear, and thus the processor does not need to approximate. When choosing a reference voxel in vascularized tissue, the reference voxel should be located directly adjacent to a large artery such as the middle cerebral artery. Generally, results will be more accurate, the closer the reference voxel is to an artery. FIG. 5A shows an MRI image of the subject, according to one example. In this example, the reference voxel is located in the choroid plexus, and the crosshairs indicate the location of the reference voxel.

Figure 5B:
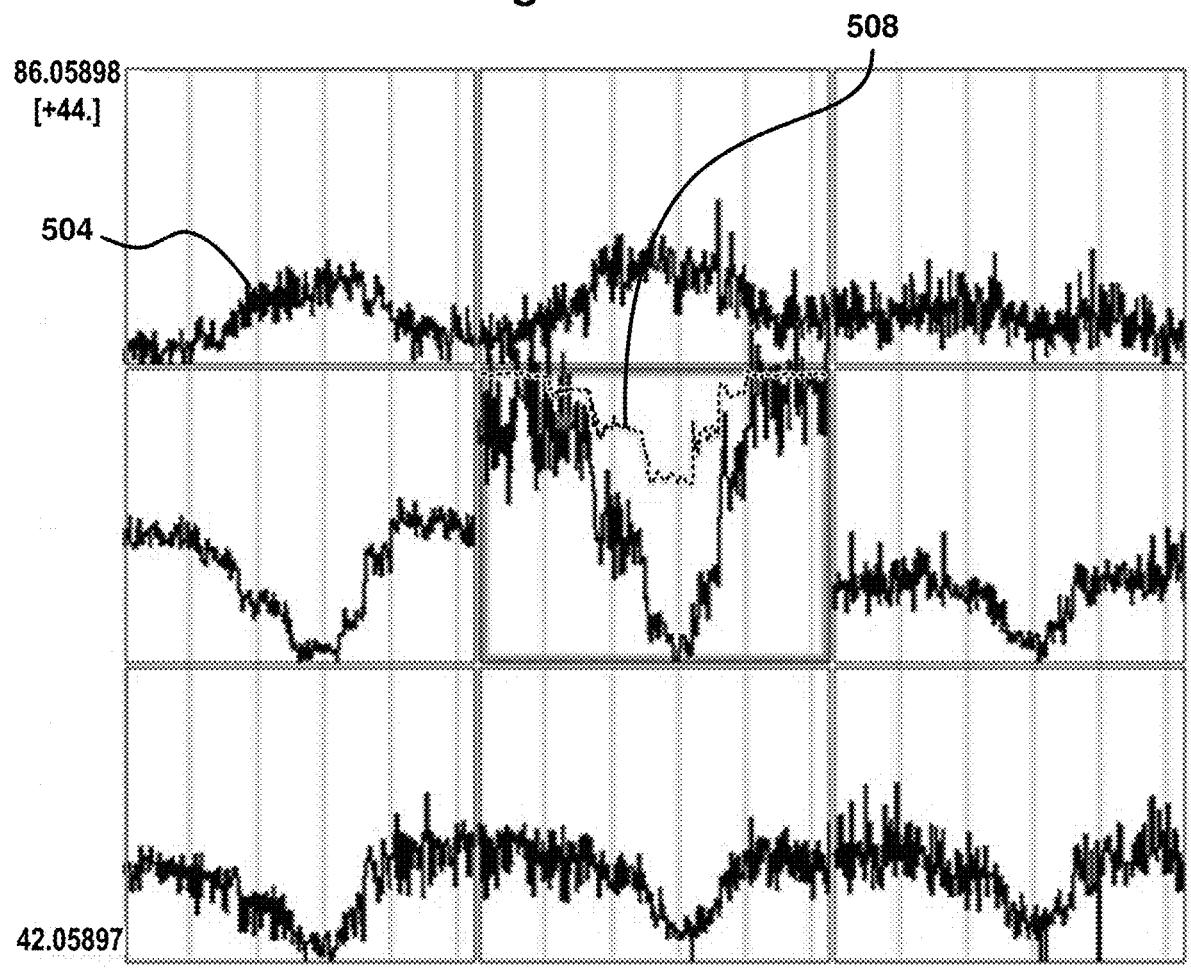
FIG. 5B is a graph showing the magnetic signal measured according to exemplary performance of the method of FIG. 2.

FIG. 5B shows an example of the magnetic signal detected in the reference voxel, according to one example. In this example, the voxel is located in the choroid plexus, as shown in FIG. 5A, and the series of $SaO_2$ changes comprises a step pattern. The magnetic signal is shown at 504, and the $PO_2$ is superimposed at 508. Since the magnetic signal 504 is responsive to the deoxyhemoglobin concentration, the magnetic signal 504 forms an analogous step shape.

Figure 6A:
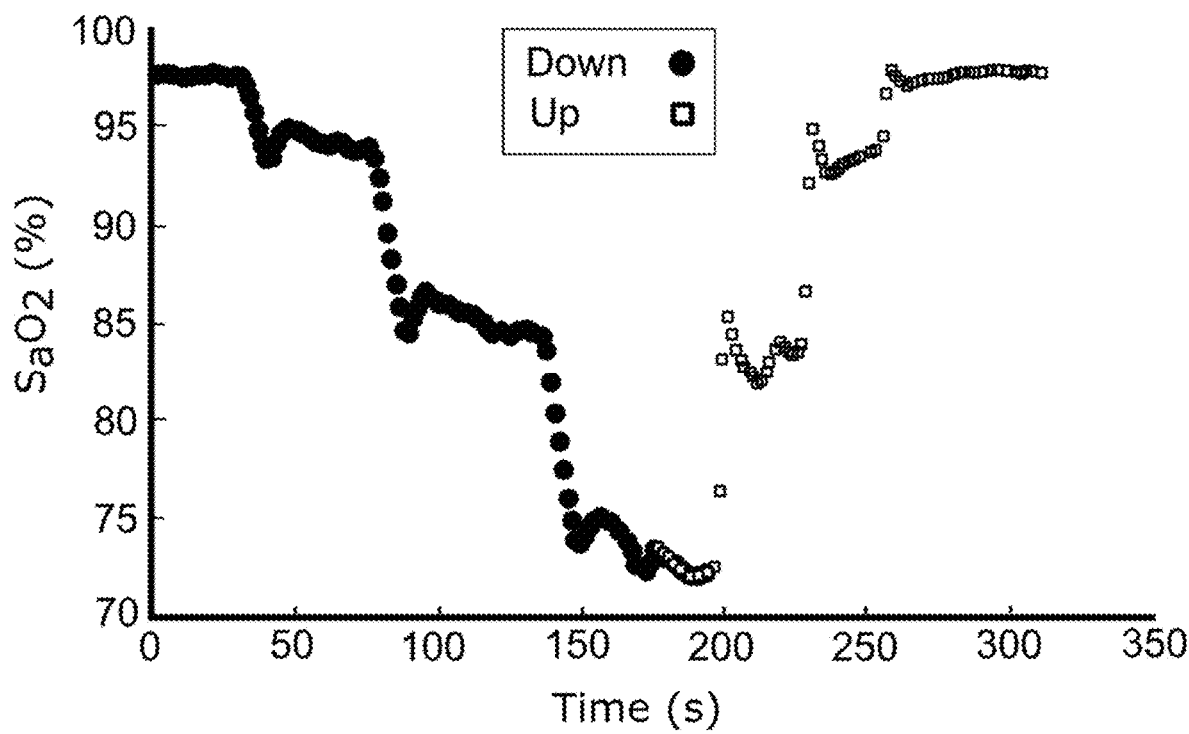
FIG. 6A is a graph showing the $SaO_2$ imposed in a subject according to exemplary performance of the method of FIG. 2.
Figure 6B:
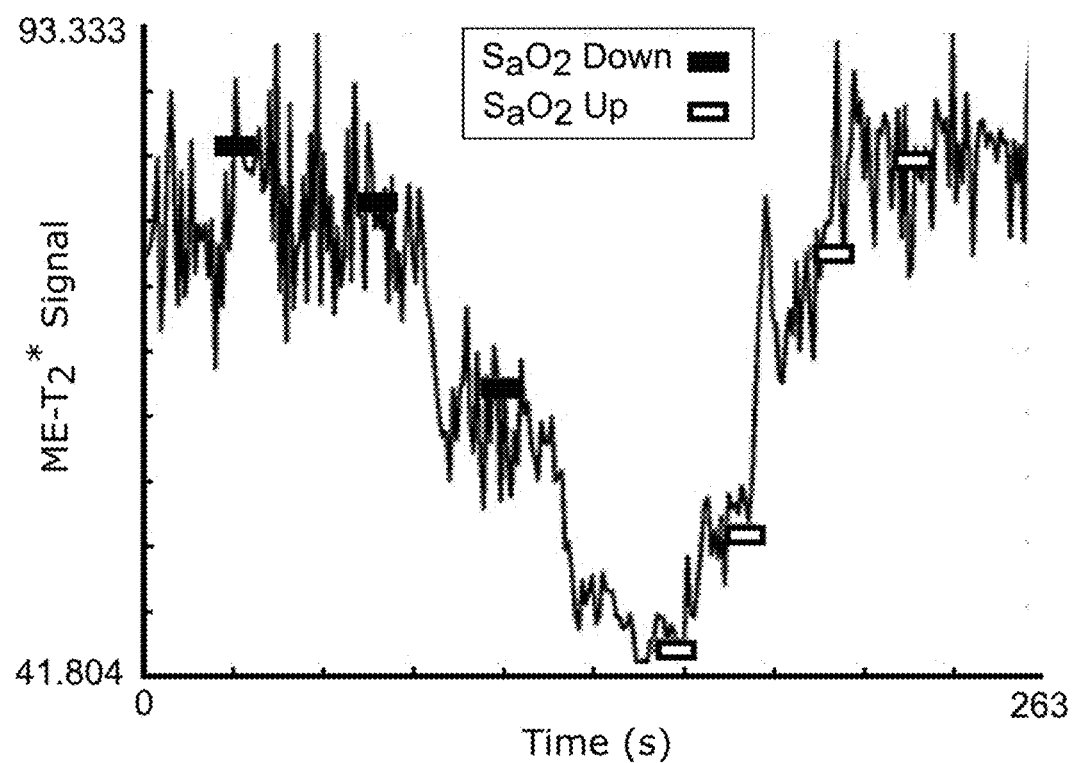
FIG. 6B is a graph showing the magnetic signal measured according to exemplary performance of the method of FIG. 2.

Another exemplary performance of block 204 is shown in FIGS. 6A and 6B. In this example, the voxel size is 3 mm×3 mm×3 mm, the repetition time is 1.5 s, the first echo time (TE1) is 10.7 ms, the second echo time (TE2) is 27.2 ms, and the third echo time (TE3) is 43.6 ms. FIG. 6A shows the $SaO_2$ pattern imposed by the SGD device 101 while FIG. 6B shows the T2* magnetic signal detected in the reference voxel in response to the $SaO_2$ changes.

Since the magnetic signal is measured while the SGD device 101 is imposing a series of $SaO_2$ changes, a plurality of magnetic signals is measured by the MRI device 102 and may be stored in memory 112 in a plurality of data records. Each data record may comprise a magnetic signal stored in association with the $SaO_2$ imposed on the subject 130 at the time that the magnetic signal was measured (herein referred to as the "corresponding $SaO_2$", and likewise the "corresponding magnetic signal").

Returning to FIG. 2, block 208 comprises calculating a relationship between the magnetic signal and the $SaO_2$ in the reference voxel. In system 100, block 208 is performed by processor 110 which computes a function describing the relationship between the magnetic signal and the $SaO_2$ in the reference voxel. The processor 110 may conduct a regression analysis to determine the relationship, and more particularly, a linear regression.

Figure 7:
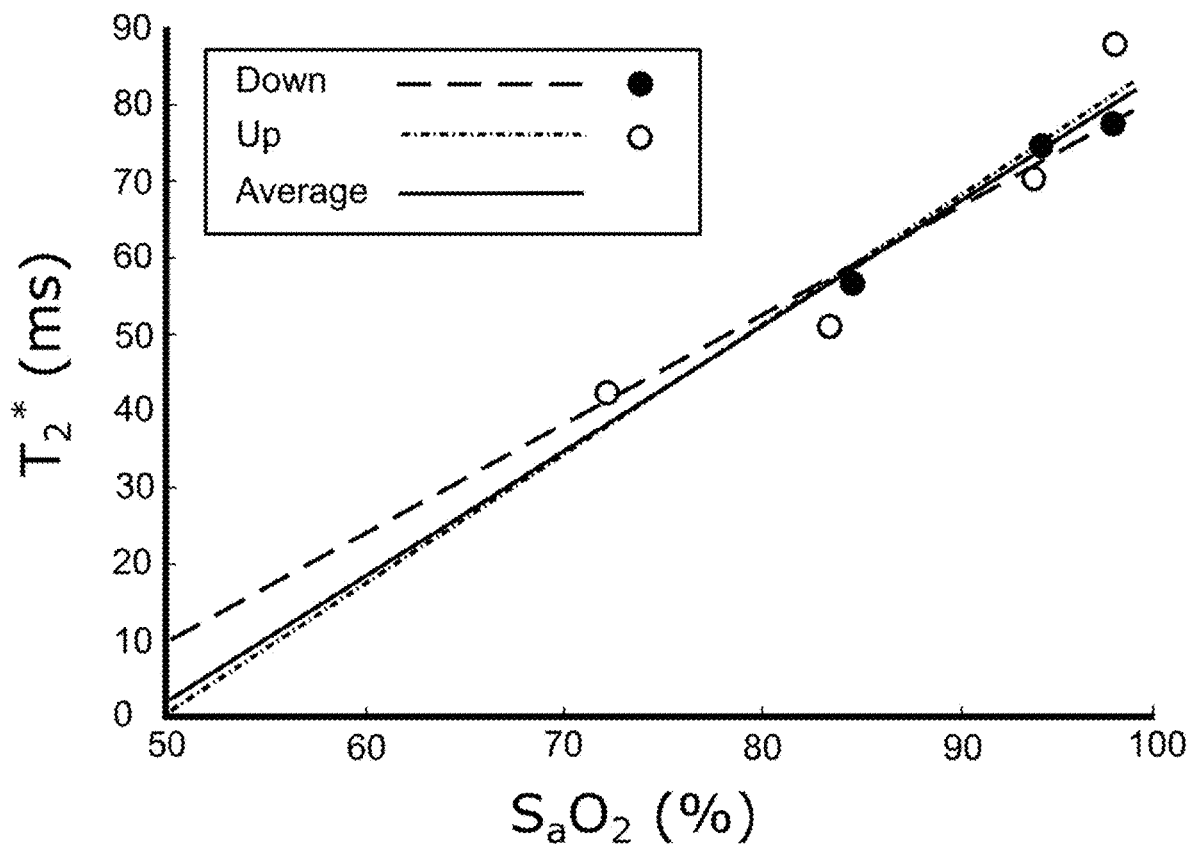
FIG. 7 is a graph showing the relationship between the magnetic signal and the $SaO_2$, according to exemplary performance of the method of FIG. 2.

FIG. 7 is a graph representing exemplary performance of block 208. The graph shows the relationship between ME-$T_{2*}$ and $SaO_2$ in the reference voxel, according to one example. In this example, the processor 110 plots the magnetic signal in milliseconds on the y-axis and the corresponding $SaO_2$ in percentage on the x-axis. The processor 110 calculates a linear regression for the data collected while the $SaO_2$ was decreasing (labelled "Down" in FIG. 7) and calculates another linear regression for the data collected while the $SaO_2$ was increasing (labelled "Up" in FIG. 7). In this example, the processor 110 approximates the slope of "Down" as $T^*_2 = 1.43 \times S_aO_2 - 61.7$ where R is 0.99, and the slope of "Up" as $T^*_2 = 1.7 \times S_aO_2 - 84.1$ where R is 0.95. The Average of "Up" and "Down" is calculated as $T^*_2 = 1.64 \times S_aO_2 - 80.6$ where R is 9.8.

Block 212 comprises measuring a magnetic signal in a target voxel. In the system 100, block 212 is performed by MRI device 102 which measures the magnetic signal in the target voxel. Generally, block 212 is performed with the same MRI parameters as block 204. In some examples, block 212 is performed before block 204, so that the target voxel is measured before calibration in the reference voxel.

The target voxel may be pre-determined according to the instructions 122, or the target voxel may be selected according to inputs received at the user interface 124. In some examples, the MRI device 102 is configured to measure a magnetic signal in a plurality of voxels including the target voxel, and in particular examples, the plurality of voxels encompassing the entire brain. For the purposes of explanation, the method 200 will be described herein with respect to a single target voxel, but it should be understood that the method could be applied to any suitable number of voxels.

Block 212 may further include controlling the subject's $SaO_2$ while measuring the magnetic signal in the target voxel. The subject's $SaO_2$ can be controlled by any technique known in the art including breath holding, delivering oxygen with a ventilator, or inducing a $SaO_2$ using the SGD device 101. The subject's $SaO_2$ may affect the results. In some examples, the SGD device 101 may control the subject's $SaO_2$ to induce or maintain normoxia, hypoxia, or hyperoxia. As a further part of block 212, the SGD device 101 may control the $PCO_2$ in the subject 130.

Block 216 comprises calculating a hemoglobin saturation ($SO_2$) of the target voxel based on the relationship calculated at block 208. In the system 100, block 216 is performed by the processor 110 which computes the hemoglobin saturation by inserting the magnetic signal for the target voxel into the function generated at block 208 and calculating the hemoglobin saturation. In the specific non-limiting example shown previously at FIG. 7, the relationship between $SaO_2$ and magnetic signal is $T^*_2 = 1.64 \times S_aO_2 - 80.6$, as determined at block 208. If the MRI device 102 measures a magnetic signal of 40 ms at block 212, the processor 110 would determine that the hemoglobin saturation for the target voxel is 73 percent.

Figure 8:
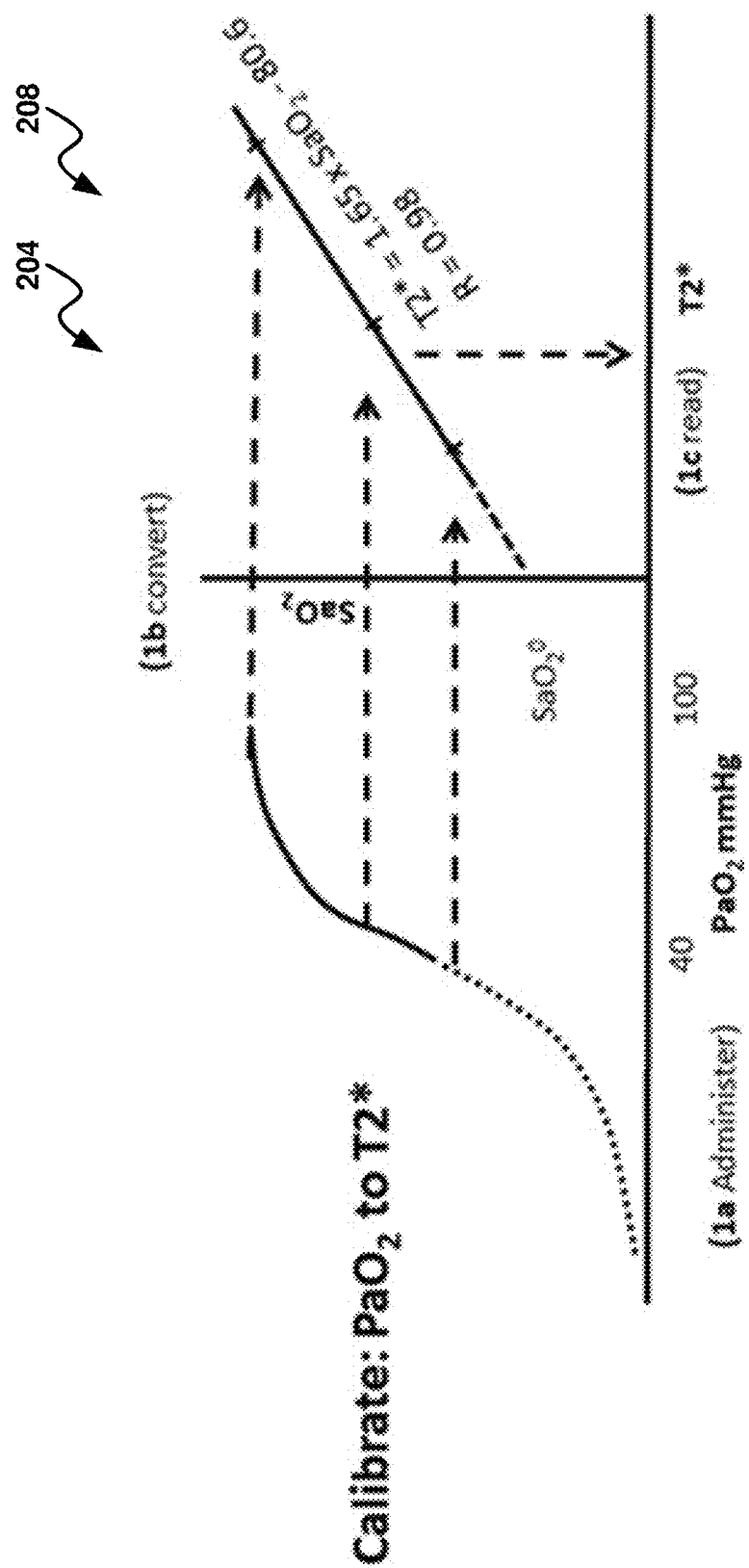
FIG. 8 is a schematic diagram showing exemplary performance of block 208 of FIG. 2.

FIG. 8 is a schematic representing exemplary performance of blocks 204 to 208. FIG. 8 depicts measuring the magnetic signal in the reference voxel while changing the $P_aO_2$ of the subject. The processor 110 converts $P_aO_2$ to $SaO_2$ according to the Hill Equation (Equation 1) and then determines a linear function that fits the relationship between the $SaO_2$ and the magnetic signal.

Figure 9:
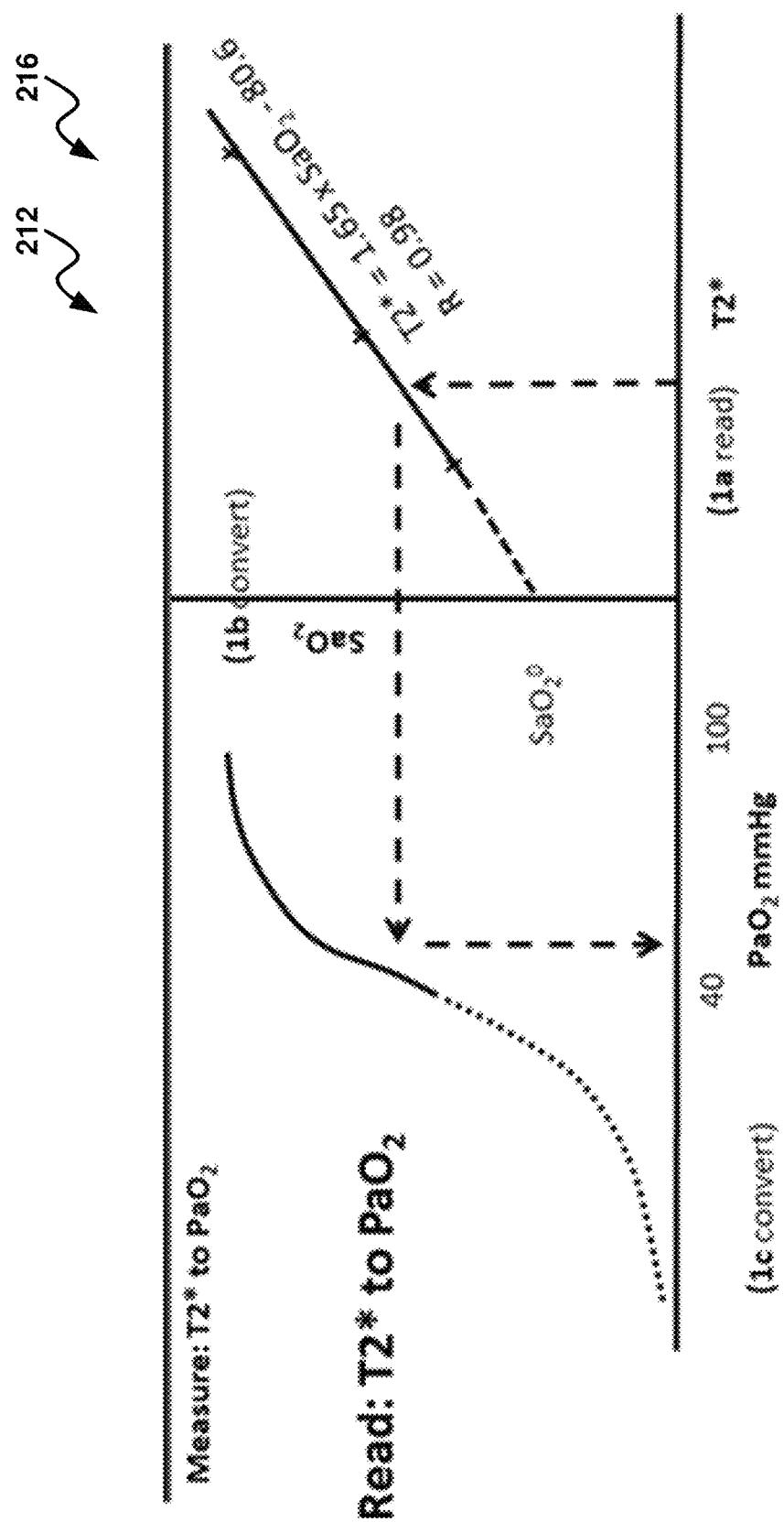
FIG. 9 is a schematic diagram showing exemplary performance of block 216 of FIG. 2.

FIG. 9 is a schematic representing exemplary performance of blocks 212 to 216. FIG. 9 depicts measuring the magnetic signal in the target voxel, then using the relationship between the magnetic signal and the $SaO_2$ of the reference voxel to determine the $SO_2$ in the target voxel. The $SO_2$ of the target voxel can be converted back to $PO_2$ using the Hill Equation (Equation 1).

Figure 10:
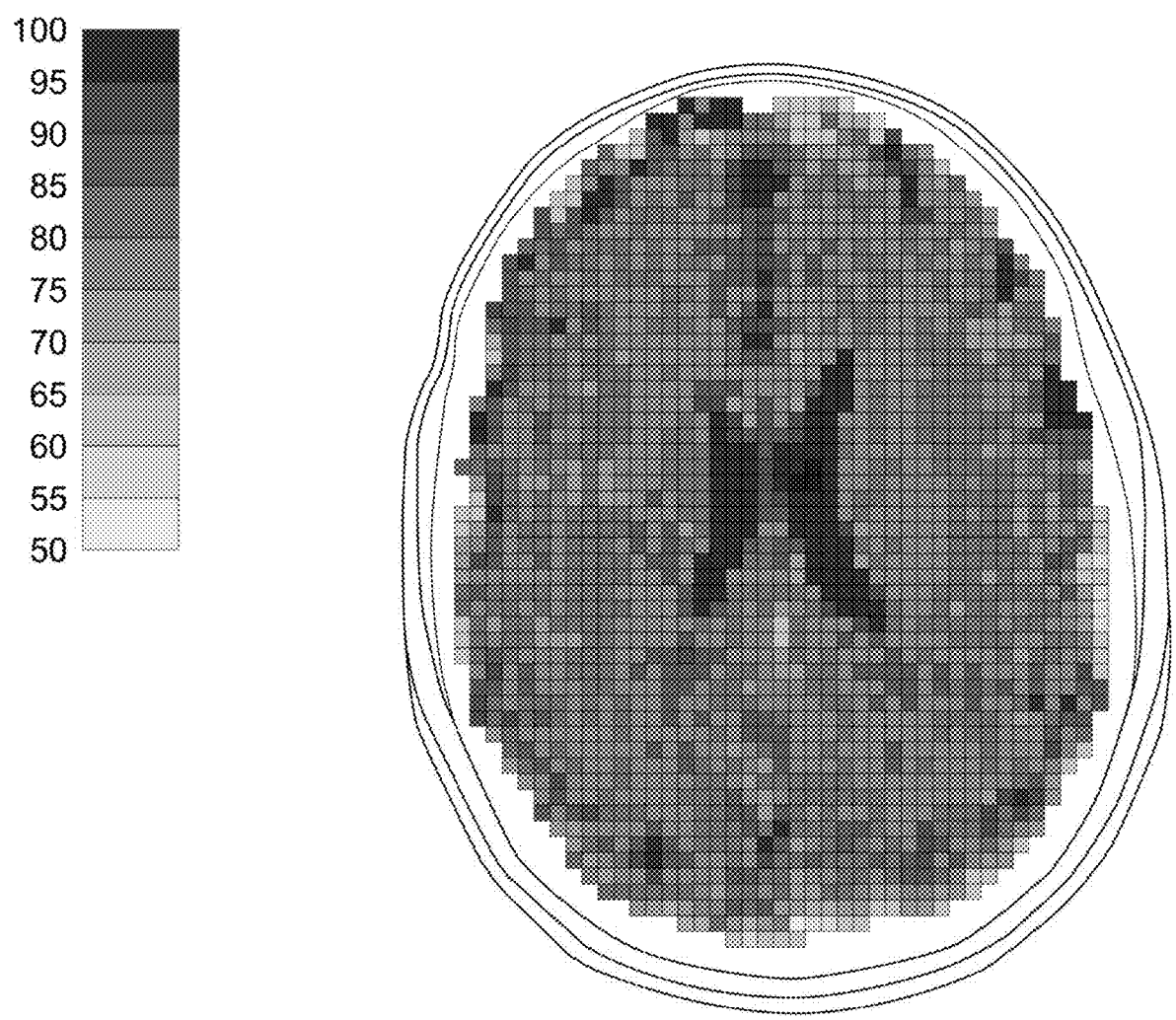
FIG. 10 is an axial image of a subject's brain showing the $SO_2$ calculated at normoxia during exemplary performance of the method of FIG. 2.
Figure 11:
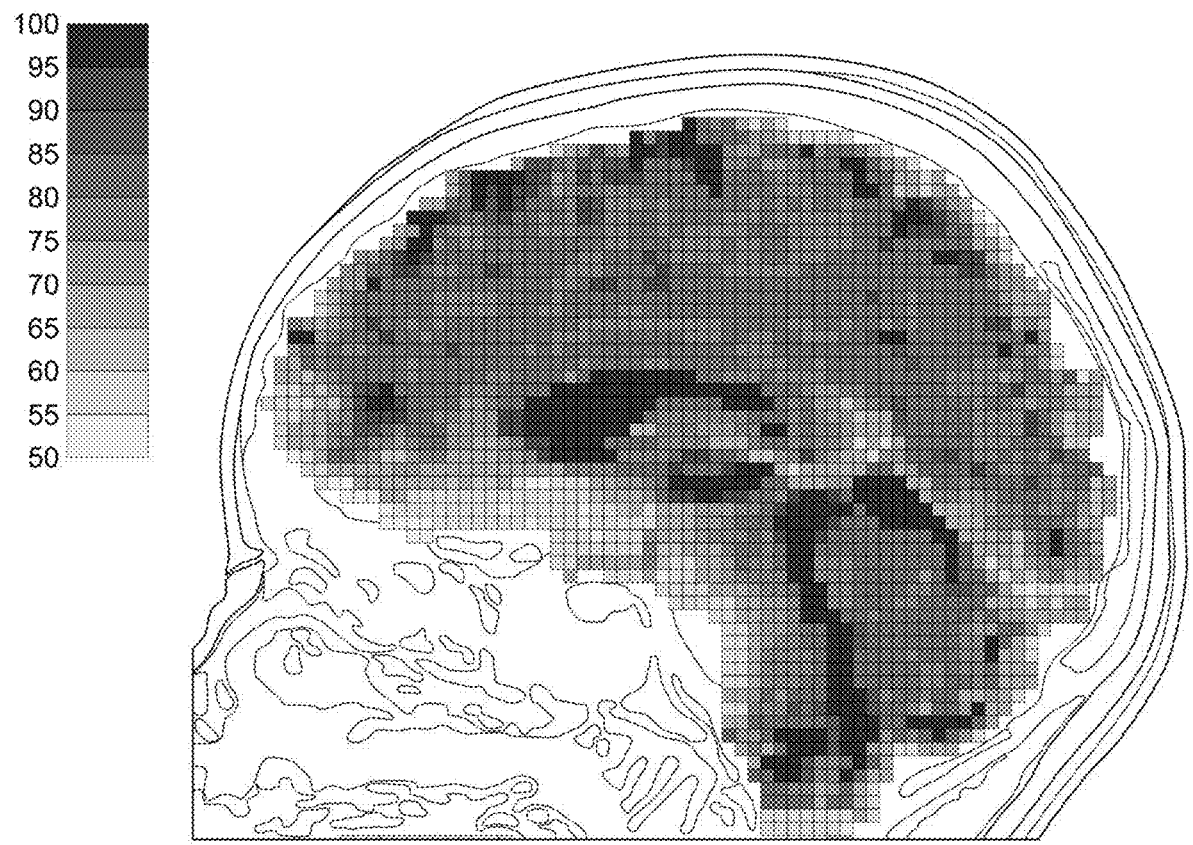
FIG. 11 is a sagittal image of a subject's brain showing the $SO_2$ calculated at normoxia during exemplary performance of the method of FIG. 2.
Figure 12:
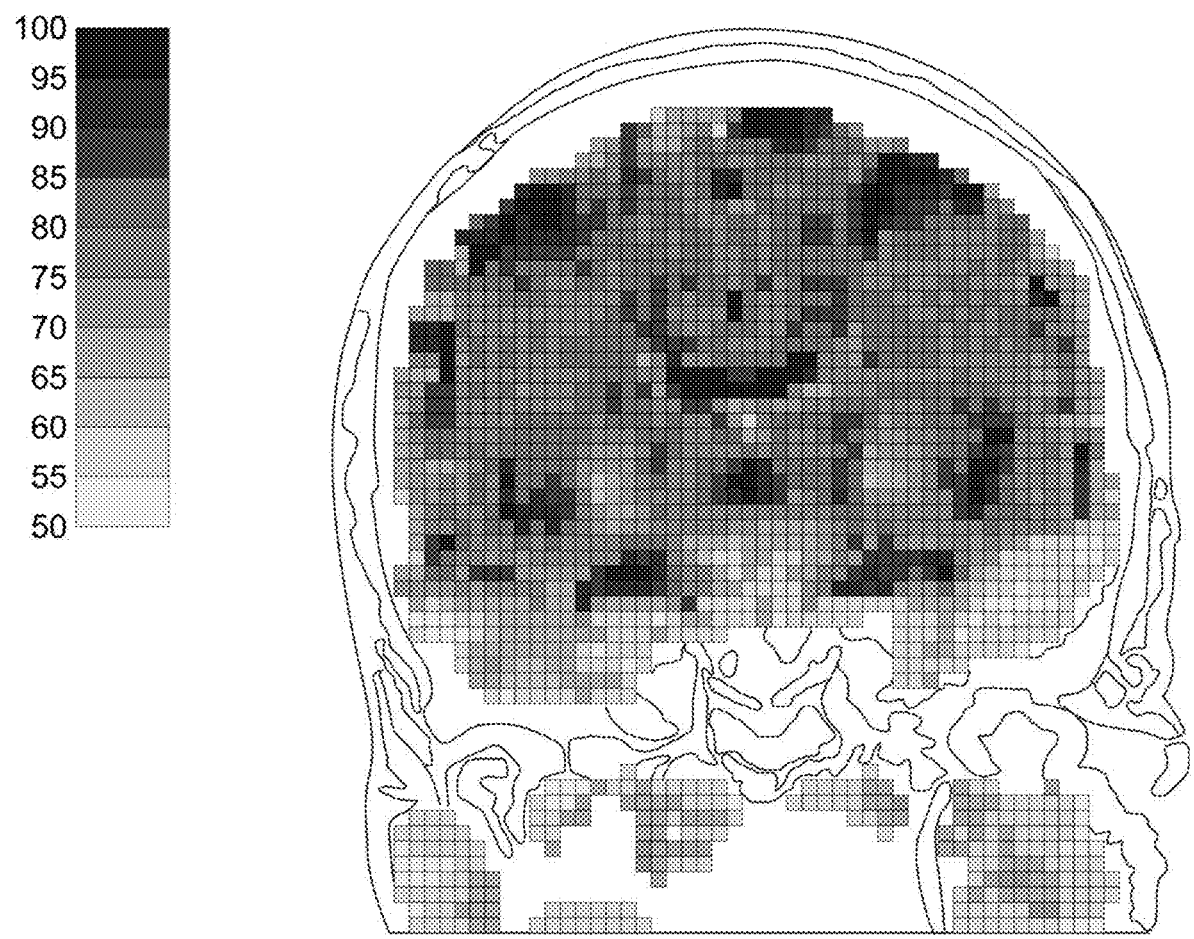
FIG. 12 is a coronal image of a subject's brain showing the $SO_2$ calculated at normoxia during exemplary performance of the method of FIG. 2.
Figure 13:
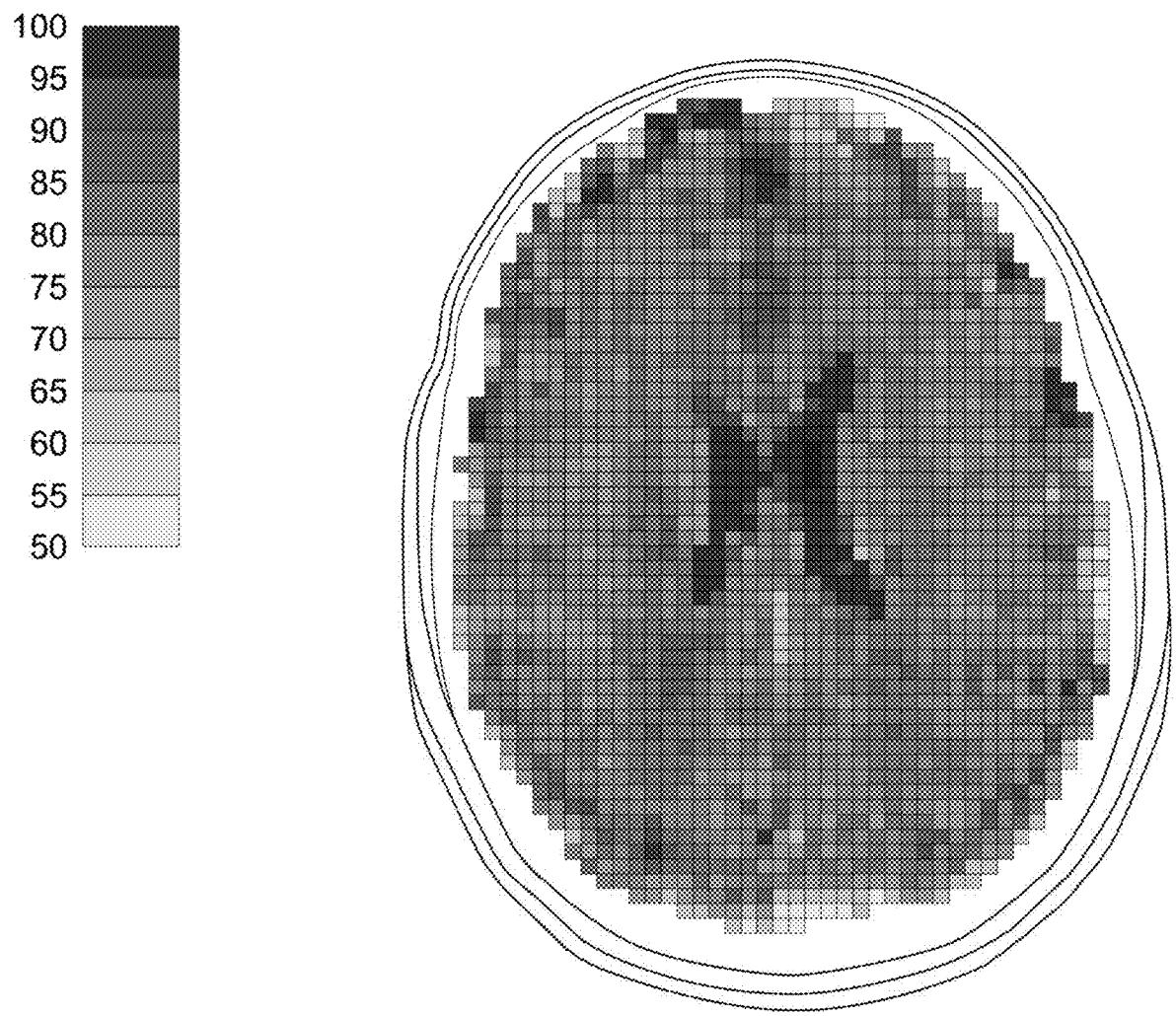
FIG. 13 is an axial image of a subject's brain showing the $SO_2$ calculated at hypoxia during exemplary performance of the method of FIG. 2.
Figure 14:
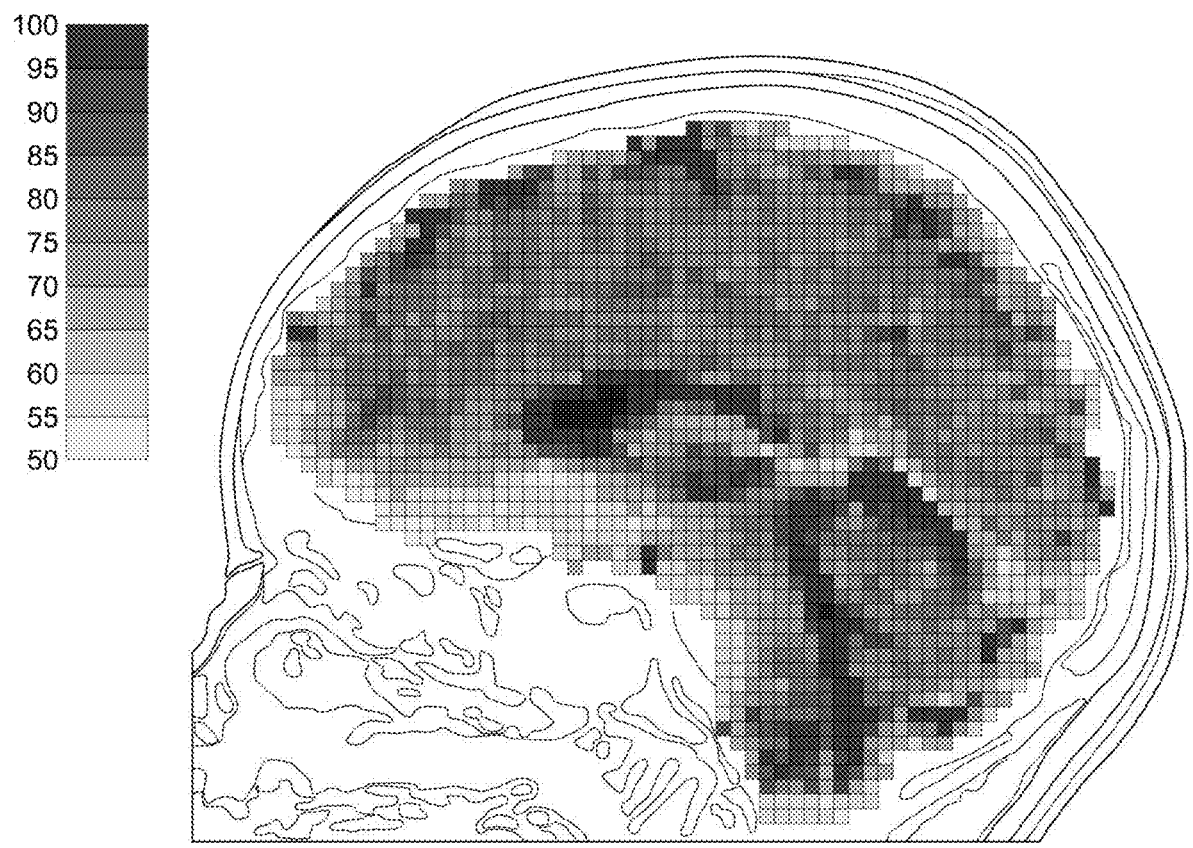
FIG. 14 is a sagittal image of a subject's brain showing the $SO_2$ calculated at hypoxia during exemplary performance of the method of FIG. 2.
Figure 15:
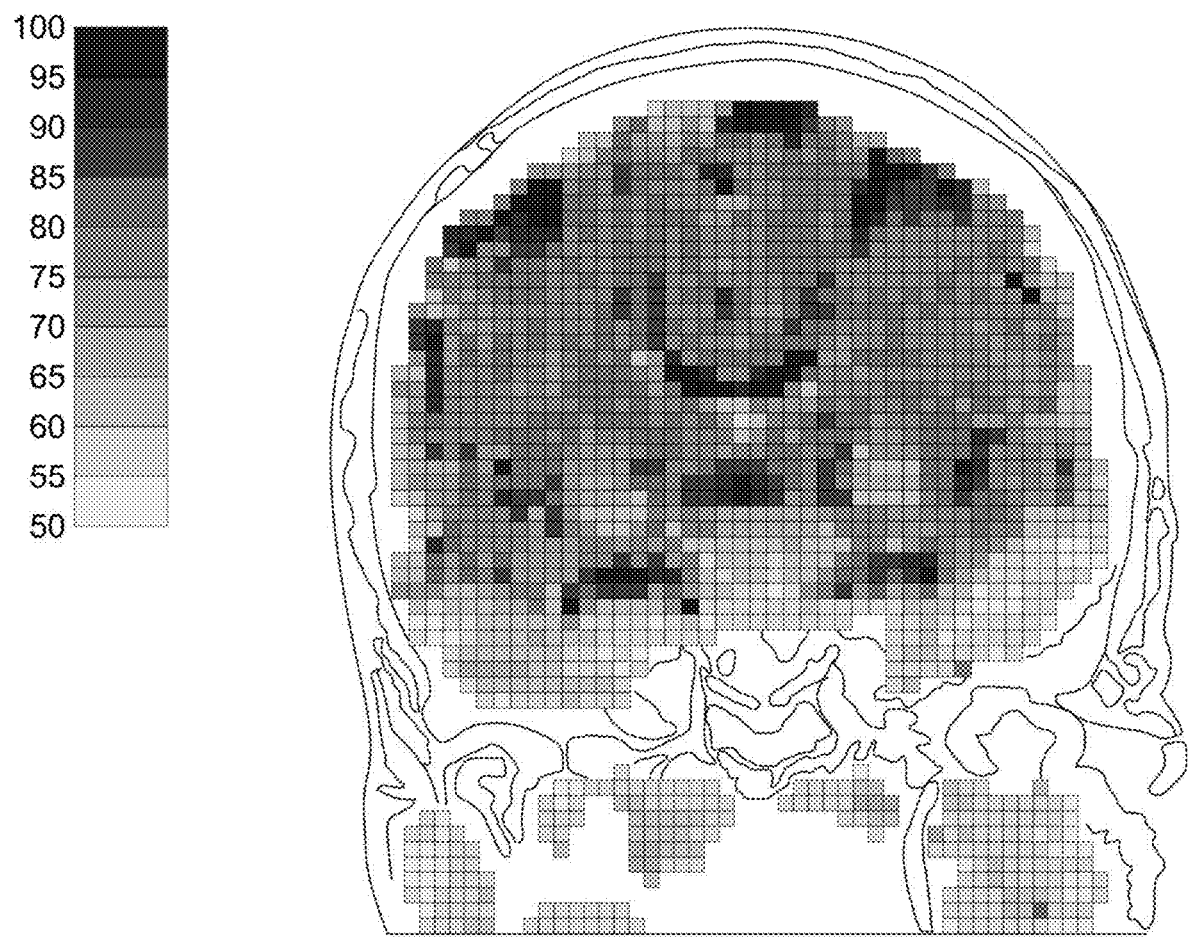
FIG. 15 is a coronal image of a subject's brain showing the $SO_2$ calculated at hypoxia during exemplary performance of the method of FIG. 2.

As a further part of block 216, the processor 110 can generate a hemoglobin saturation map of the subject's brain, indicating the hemoglobin saturation for a plurality of target voxels. FIGS. 10 to 12 show hemoglobin saturation maps of a subject's brain generated during exemplary performance of method 200 on a subject at normoxia. FIGS. 13 to 15 show hemoglobin saturation maps of a subject's brain generated during exemplary performance of method 200 on a subject at hypoxia. In FIGS. 10 to 15, the hemoglobin saturation is represented by grayscale, with light gray representing voxels having the lowest hemoglobin saturation, and black representing voxels having the highest hemoglobin saturation.

By comparing FIGS. 10 to 15, it can be seen that that the relationship between ME-T2* and $SaO_2$ is valid for voxels containing arterial and venous blood. In voxels containing a mixture of blood and avascular tissue, the relative contributions of arteries, veins, or tissue is unknown, however in comparing the hemoglobin saturation calculated for tissue and blood vessels, it is clear that the overall hemoglobin saturation is higher during normoxia than hypoxia. This may reflect the net effect of arterioles that are smaller than voxels yet affect the magnetic signal. Major veins such as the sagittal sinus, straight sinus, and sigmoidal sinus are identifiable in the hemoglobin saturation maps of FIGS. 10 to 15. Accordingly, the processor 110 may be further configured to visualize blood vessels based on the hemoglobin saturations calculated for a plurality of voxels, and in particular examples, the processor 110 is configured to generate an angiogram or venogram of the subject's brain by thresholding the hemoglobin saturation map to arterial or venous oxygen saturations. In an angiogram, voxels having a hemoglobin saturation above a pre-determined threshold may be identified as an artery by the processor 110. In a venogram, voxels having a hemoglobin saturation below a pre-determined threshold may be identified as a vein. Referring to FIGS. 10 to 15, the voxels having a hemoglobin saturation above 80% may be identified as arteries, and voxels having a hemoglobin saturation below 70% may be identified as veins.

Vascular steal can further be detected using the above-described techniques. Vascular steal can occur when vasodilation is inhibited in a vessel, causing blood flow to be diverted to surrounding vessels. For example, the response to a vasoactive stimulus may be dampened or nullified in a vessel because of injury, tumor, surgery, stenosis, or the like. Healthy vessels nearby will nonetheless respond to the vasoactive stimulus, which diverts blood flow to the healthy vessels, leaving the injured vessel hypoxic and can potentially cause ischemia. To detect vascular steal using method 200, the SGD device 101 controls the subject's $PCO_2$ to impose a $CO_2$ challenge. Block 212 is performed first at normocapnia and then repeated at hypercapnia. Generally, the SGD device 101 maintains the $SaO_2$ during this process. As part of block 216, the processor 110 compares the hemoglobin saturation for normocapnia to the hemoglobin saturation calculated for hypercapnia. If the difference is significant, the target voxel is subject to steal. If the difference is zero or insignificant, the target voxel is not subject to steal. The processor may calculate the difference for a plurality of target voxels to generate a thresholded $PO_2$ map of the subject's brain that can be used to locate vascular steal.

The method is not particularly limited to the order shown in FIG. 2, and the blocks may be performed in other orders. In one example, the magnetic signal may be measured in the reference voxel and the target voxel simultaneously. In another example, the magnetic signal in the target voxel may be measured at block 212 before calculating the relationship between the magnetic signal and the $SaO_2$ at block 208.

In some examples, the processor 110 is further configured to calculate the oxygen extraction fraction (OEF) based on the hemoglobin saturation. In the system 100, block 220 is performed by the processor 110 which computes the OEF according to Equation 2:

$$OEF = (SaO_2 - SvO_2)/SaO_2 \qquad \text{Equation 2}$$

The method 200 may further include a statistical analysis. In these examples, the processor 110 is configured to score the partial pressure of oxygen ($PO_2$) for the target voxel against a statistical value. The statistical value may be retrieved from the memory 112 or input at the user interface 114. The statistical value represents the $PO_2$ for the target voxel at an earlier point in time, a corresponding voxel in the opposite hemisphere of the subject's brain, a corresponding region of interest (i.e., a voxel where oxygenation is the same as the target voxel), a corresponding voxel of another subject, or a corresponding voxel in a population. In a specific example, the statistical value represents the mean $PO_2$ for the corresponding voxel in the population. The population may be selected based on a common health condition including but not limited to ischemia, transplants, grafts, inflammation, brain injury, tumor, sickle cell disease, hypertension, and multiple sclerosis. As will be described by way of example herein, the score may be used to detect, assess, or diagnosis the health condition in the subject 130. In examples where the magnetic signal is measured in a plurality of target voxels, the processor 110 may further generate a map displaying the scores for a plurality of target voxels. The map may be used to locate irregularities in the subject's brain. The scores and the map may be output at the user interface 114 or transmitted via the network.

In a specific, non-limiting example, the processor 110 is configured to assess perfusion deficit caused by an arterial stenosis. In this example, the processor 110 converts the hemoglobin saturation calculated at block 216 to $PO_2$ for a plurality of target voxels and generates a $PO_2$ map of the subject's brain. The $PO_2$ map of the subject's brain may be output at the user interface 114 for assessment. The $PO_2$ may be further scored against a statistical value representing the subject's brain before the stenosis was inserted, a corresponding venous region of the subject's brain which is not downstream of the stenosis, or a corresponding region in a healthy individual or a health population. The scores for a plurality of voxels may be output as a map at the user interface 114. The processor may further analyze the scores. If the score exceeds a pre-determined threshold, the processor 110 may determine that there is a perfusion deficit caused by the upstream stenosis. The processor 110 may further assess the extent of the perfusion deficit caused by the stenosis. The determination may be output at the user interface 114.

In another specific, non-limiting example, the processor 110 is configured to assess perfusion in a tumor. In this example, the processor 110 converts the hemoglobin saturation calculated at block 216 to $PO_2$ for a plurality of target voxels and generates a $PO_2$ map of the subject's brain. In vascular tumors, the venous $PO_2$ may reflect the tumor $PO_2$, and thus a tumor with low venous $PO_2$ may be hypoxic. The $PO_2$ in tumors may reflect their vulnerability to radiation, various chemotherapy or surgery, and risk of metastasizing. The processor 110 may further calculate the oxygen extraction fraction (OEF) for the tumor as described above with respect to Equation 2. If the OEF is below a pre-determined threshold, the processor 110 determines that the tumor is hypoxic.

In another specific, non-limiting example, the processor 110 is configured to assess the efficacy of revascularization of ischemic territories, grafts, or transplants. In this example, the processor 110 converts the hemoglobin saturation calculated at block 216 to $PO_2$ for a plurality of target voxels and generates a $PO_2$ map of the subject's brain. The venous $PO_2$ may reflect the adequacy of a surgically placed bypass, revascularization of a graft or a transplant. A successful graft should increase the venous $PO_2$. The processor 110 may further calculate the oxygen extraction fraction (OEF) for the region of interest as described above with respect to Equation 2. If the OED is below a pre-determined threshold, the processor 110 determines that the graft or transplant was not successful or requires further intervention.

In another specific, non-limiting example, the processor 110 is configured to evaluate multiple sclerosis. Multiple sclerosis can be diagnosed or assessed by identifying regions of reduced $PO_2$ in the subject's brain. The $PO_2$ map of the subject's brain may be compared to a $PO_2$ map of a healthy population or a population with multiple sclerosis.

In another specific, non-limiting example, the processor 110 is configured to evaluate inflammation. Inflammation may cause both increased and decreased $PO_2$, and thus inflammation can be diagnosed or assessed by analyzing the $PO_2$ of the subject's brain.

In another specific, non-limiting example, the processor 110 is configured to evaluate a traumatic brain injury. Traumatic brain injuries can increase $PO_2$ and blood flow, and thus a traumatic brain injury can be diagnosed according to the $PO_2$. The processor 110 may be further configured to assess the severity of the injury based on the $PO_2$ and assess recovery.

In another specific, non-limiting example, the processor 110 is configured to evaluate transfusion requirements of the subject. In these examples, the subject 130 has a hemoglobinopathy (such as sickle cell disease, thalassemia, or hemoglobin disease), anemia, blood loss, leukemia, bone marrow disorder, infection, or another health condition which requires blood transfusion. $PO_2$ measurements of the subject's brain may be used to evaluate the subject's need for blood transfusions.

In another specific, non-limiting example, the processor 110 is configured to monitor an antihypertensive therapy. In particular, elderly subjects and subjects with coronary artery disease, chronic kidney disease, diabetes mellitus, heart failure, cerebral edema or intracranial bleeding are susceptible to decreased blood flow as a result of antihypertensive therapies. The processor 110 may be configured to evaluate the antihypertensive therapy according to the $PO_2$.

In view of the above, it will now be apparent that variants, combinations, and subsets of the foregoing embodiments are contemplated. For example, while method 200 was discussed above in relation to the brain, other organs and tissues are contemplated. Generally, any region with venous blood or tissue perfusion can be imaged with ME-T2* or QSM, including but not limited to tumors, liver, kidney, and limbs.

It will now be apparent to a person of skill in the art that the present specification affords certain advantages over the prior art. In particular, the specification provides a standardized method of quantifying $PO_2$ and OEF in a subject, enabling consistent measurements across different regions of interest within a subject's brain, at various time points, and among individuals in a population. This capability facilitates the building of statistical models of OEF variations for health conditions, enabling more precise assessments and comparisons. By standardizing OEF measurements, the method improves the reliability and repeatability of data, supporting robust clinical and research applications such as monitoring disease progression, evaluating treatment efficacy, and conducting large-scale epidemiological studies.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of measuring brain tissue oxygenation in a subject comprising:
   measuring a magnetic signal in a reference voxel of subject's brain using a magnetic resonance imaging device while imposing a series of arterial blood oxygen saturation ($SaO_2$) changes in the subject using sequential gas delivery;
   calculating a relationship between the magnetic signal and the $SaO_2$ in the reference voxel;
   measuring a magnetic signal in a target voxel; and
   calculating the hemoglobin saturation ($SO_2$) in the target voxel based on the relationship between the magnetic signal and the $SaO_2$ in the reference voxel.

2. The method of claim 1, wherein measuring the magnetic signal in the reference voxel and the target voxel comprises applying multi-echo T2* imaging.

3. The method of claim 1, wherein the reference voxel is in the middle cerebral artery or choroid plexus.

4. The method of claim 1, wherein the series of $SO_2$ changes comprises a step pattern, a ramping pattern, or a sinusoidal pattern.

5. The method of claim 1 further comprising:
   measuring a magnetic signal in a plurality of voxels including the target voxel;
   calculating the hemoglobin saturation in the plurality of voxels based on the relationship between the magnetic signal and the $SaO_2$ in the reference voxel;
   convert the hemoglobin saturation to a partial pressure of oxygen ($PO_2$); and
   generating a $PO_2$ map for the plurality of voxels.

6. The method of claim 5 further comprising identifying voxels as arterial or venous based on pre-determined hemoglobin saturation thresholds, and generating an angiogram or venogram based on the pre-determined hemoglobin saturation thresholds.

7. The method of claim 5 further comprising:
   scoring the hemoglobin saturation of the target voxel against a statistical value,
   wherein the statistical value represents the hemoglobin saturation in a voxel of an opposite hemisphere, a corresponding region of interest, another subject, or a population of subjects.

8. The method of claim 7, further comprising assessing the severity of ischemia, a transplant, a graft, inflammation, a brain injury, a tumor, sickle cell disease, hypertension, or multiple sclerosis based on the score.

9. A system for measuring brain tissue oxygenation in a subject comprising:
   a sequential gas delivery device for imposing a series of $SaO_2$ changes in the subject;
   a magnetic resonance imaging device for measuring magnetic signals in a reference voxel and a target voxel of the subject's brain; and
   a processor configured to:
      calculate a relationship between the magnetic signal and the $SaO_2$ in the reference voxel; and
      calculate the hemoglobin saturation ($SO_2$) in the target voxel based on the relationship between the magnetic signal and the $SaO_2$ in the reference voxel.

10. The system of claim 9, wherein the magnetic resonance imaging device is configured to measure the magnetic signals with multi-echo T2* or quantitative susceptibility mapping.

11. The system of claim 9, wherein the reference voxel is in the middle cerebral artery or choroid plexus.

12. The system of claim 9, wherein the series of $SaO_2$ changes comprises a step pattern, a ramping pattern, or a sinusoidal pattern.

13. The system of claim 9 wherein:
   the magnetic resonance imaging device is further configured to measure the magnetic signal in a plurality of voxels including the target voxel, and calculate the hemoglobin saturations in the plurality of voxels based on the relationship between the magnetic signal and the $SaO_2$ in the reference voxel; and
   the processor is further configured to convert the hemoglobin saturations to partial pressures of oxygen ($PO_2$) and generate a $PO_2$ map for the plurality of voxels.

14. The system of claim 13 further comprising generating an angiogram or venogram based on thresholding the $PO_2$ map to arterial or venous oxygen saturations.

15. The system of claim 13 wherein the processor is further configured to score the hemoglobin saturation of the target voxel against a statistical value, and wherein the statistical value represents the hemoglobin saturation in a voxel of an opposite hemisphere, a corresponding region of interest, another subject, or a population of subjects.

16. The system of claim 15, wherein the processor is further configured to assess the severity of ischemia, a transplant, a graft, inflammation, a brain injury, a tumor, sickle cell disease, hypertension, or multiple sclerosis based on the score.

\* \* \* \* \*